United States Patent
Liu et al.

(10) Patent No.: US 12,346,794 B2
(45) Date of Patent: Jul. 1, 2025

(54) SYSTEMS AND METHODS FOR PREDICTING TRAJECTORIES OF MULTIPLE VEHICLES

(71) Applicant: Toyota Motor Engineering & Manufacturing North America, Inc., Plano, TX (US)

(72) Inventors: Yongkang Liu, Mountain View, CA (US); Xuewei Qi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 831 days.

(21) Appl. No.: 17/537,921

(22) Filed: Nov. 30, 2021

(65) Prior Publication Data
US 2023/0085296 A1 Mar. 16, 2023

Related U.S. Application Data

(60) Provisional application No. 63/237,588, filed on Aug. 27, 2021.

(51) Int. Cl.
*G06N 3/047* (2023.01)
*G06N 3/08* (2023.01)
(Continued)

(52) U.S. Cl.
CPC .............. *G06N 3/047* (2023.01); *G06N 3/08* (2013.01); *G01C 21/36* (2013.01); *G08G 1/096708* (2013.01)

(58) Field of Classification Search
CPC ........ G06N 3/047; G06N 3/08; G06N 3/0442; G06N 3/0464; G06N 3/042; G06N 3/0455;
(Continued)

(56) References Cited

U.S. PATENT DOCUMENTS 11,151,880 B1 * 10/2021 Shou .................... G08G 1/0141
11,256,964 B2 * 2/2022 Brown ..................... G06N 3/08
(Continued)

FOREIGN PATENT DOCUMENTS

CN       111931905 A    11/2020
CN       112861332 A    5/2021
(Continued)

OTHER PUBLICATIONS

Sadeghian et al., "SoPhie: An attentive gan for predicting paths compliant to social and physical constraints," In Proceedings of the IEEE/CVF Conference on Computer Vision and Pattern Recognition, 2019, pp. 1349-1358.
(Continued)

*Primary Examiner* — Sohana Tanju Khayer
(74) *Attorney, Agent, or Firm* — Christopher G. Darrow; DARROW MUSTAFA PC

(57) ABSTRACT

System, methods, and other embodiments described herein relate to predicting trajectories of multiple vehicles using graphs and multiple decoding models. In one embodiment, a method includes computing, using an encoding model, a graph having a geographic map and vehicle features associated with a plurality of vehicles in an area according to characteristics, prior trajectories, and spatiotemporal interactions. The method also includes processing, using the encoding model, updates for the geographic map and the vehicle features separately in association with encoded features of neighboring vehicles. The method also includes decoding, using a probability model and a regression model, the geographic map and the vehicle features to output estimated trajectories for the plurality of vehicles.

20 Claims, 9 Drawing Sheets

(51) Int. Cl.
      *G01C 21/36*      (2006.01)
      *G08G 1/0967*     (2006.01)
(58) Field of Classification Search
      CPC ...... G06N 3/09; G01C 21/36; G01C 21/3833;
                 G01C 21/3807; G08G 1/096708; G08G
                 1/0112; G08G 1/0129; G08G 1/0133;
                 G08G 1/0141
      See application file for complete search history.

(56)                    References Cited

U.S. PATENT DOCUMENTS

| | | | | |
|---|---|---|---|---|
| 11,867,528 | B2* | 1/2024 | Mubarek | G01C 21/3815 |
| 12,110,042 | B1* | 10/2024 | Hoang | G06N 3/045 |
| 12,177,306 | B2* | 12/2024 | Raisher | H04L 67/52 |
| 2010/0106603 | A1* | 4/2010 | Dey | G08G 1/096811 705/14.63 |
| 2013/0253797 | A1* | 9/2013 | McNew | B60W 30/143 701/1 |
| 2014/0088855 | A1* | 3/2014 | Ferguson | G08G 1/166 701/117 |
| 2018/0365533 | A1* | 12/2018 | Sathyanarayana | G06F 18/24 |
| 2020/0017117 | A1 | 1/2020 | Milton | |
| 2020/0174481 | A1* | 6/2020 | Van Heukelom | G01C 21/3407 |
| 2020/0238979 | A1* | 7/2020 | Woo | B62D 15/0285 |
| 2021/0237779 | A1* | 8/2021 | Das | G08G 1/0129 |
| 2021/0341927 | A1* | 11/2021 | Refaat | B60W 50/0097 |
| 2021/0375290 | A1* | 12/2021 | Hu | G10L 17/22 |
| 2022/0017072 | A1* | 1/2022 | Hayakawa | B60Q 1/507 |
| 2022/0017122 | A1* | 1/2022 | Malla | G06N 3/049 |
| 2022/0090922 | A1* | 3/2022 | Neumann | G01C 21/3415 |
| 2022/0138568 | A1* | 5/2022 | Smolyanskiy | G06N 3/044 706/21 |
| 2022/0171065 | A1* | 6/2022 | Li | B60W 50/0097 |
| 2022/0269281 | A1* | 8/2022 | Cheng | G01C 21/32 |
| 2022/0272168 | A1* | 8/2022 | Raisher | G01C 21/3617 |
| 2022/0327217 | A1* | 10/2022 | Gwilliams | G06Q 50/265 |
| 2022/0350336 | A1* | 11/2022 | Gyllenhammar | G05D 1/0221 |
| 2022/0410929 | A1* | 12/2022 | Kim | B60W 40/02 |

FOREIGN PATENT DOCUMENTS

| | | |
|---|---|---|
| CN | 113119996 A | 7/2021 |
| EP | 3598411 A1 | 1/2020 |
| KR | 20110130992 A | 12/2011 |

OTHER PUBLICATIONS

Salzmann et al., "Trajectron++: Dynamically-feasible trajectory forecasting with heterogeneous data," Computer Vision—ECCV 2020, Lecture Notes in Computer Science, vol. 12363, pp. 683-700.
Scarselli et al., "The graph neural network model," in IEEE Transactions on Neural Networks, vol. 20, No. 1, Jan. 2009, pp. 61-80.
Tang et al., "Multiple futures prediction," 33rd Conference on Neural Information Processing Systems, 2019, pp. 15424-15434.
Xu et al., "How powerful are graph neural networks?" arXiv:1810.00826, Feb. 22, 2019, pp. 1-17.
Ye et al., "TPCN: Temporal Point Cloud Networks for Motion Forecasting," In Proceedings of the IEEE/CVF Conference on Computer Vision and Pattern Recognition, 2021, pp. 11318-11327.
Ying et al., "Graph convolutional neural networks for web-scale recommender systems," In Proceedings of the 24th ACM SIGKDD International Conference on Knowledge Discovery & Data Mining, Jun. 2018, pp. 974-983.
Yu et al., "Spatio-temporal graph convolutional networks: A deep learning framework for traffic forecasting," arXiv:1709.04875, Jul. 12, 2018, pp. 1-7.
Yu et al., "Spatio-temporal graph transformer networks for pedestrian trajectory prediction," In European Conference on Computer Vision, Jul. 24, 2020, pp. 507-523.

Yuan et al., "Agent-Former: Agent-Aware Transformers for Socio-Temporal Multi-Agent Forecasting," arXiv:2103.14023, Oct. 7, 2021, pp. 1-14.
Zhao et al., "TNT: Target-driveN Trajectory Prediction," arXiv:2008.08294, 2020, pp. 1-12.
Zhou et al., "Graph neural networks: A review of methods and applications," AI Open, vol. 1, 2020, pp. 57-81.
Zitnik et al., "Modeling polypharmacy side effects with graph convolutional networks," Bioinformatics, vol. 34, issue 13, Jul. 2018, pp. i457-i466.
Vaswani et al., "Attention is All You Need," Proceedings of the 31st International Conference on Neural Information Processing Systems, Dec. 2017, pp. 6000-6010.
Mo et al., "Graph and Recurrent Neural Network-based Vehicle Trajectory Prediction for Highway Driving" 2021 IEEE International Intelligent Transportation Systems Conference (ITSC), 2021, pp. 1934-1939.
Petrovic et al., "Learning the Markov order of paths in a network," arXiv:2007.02861, Jul. 6, 2020, pp. 1-15.
Guo et al., "A Graph-Based Approach to Vehicle Trajectory Analysis," Journal of Location Based Services, vol. 4, Issue 3-4, Sep. 2010, pp. 183-199.
Tang et al., "Joint Modeling of Dense and Incomplete Trajectories for Citywide Traffic Volume Inference," The World Wide Web Conference, May 2019, pp. 1806-1817.
Rainbow et al., "Semantics—STGCNN: A Semantics-guided Spatial-Temporal Graph Convolutional Network for Multi-class Trajectory Prediction," IEEE SMC 2021, pp. 1-8.
Wu et al., "A Comprehensive Survey on Graph Neural Networks," in IEEE Transactions on Neural Networks and Learning Systems, vol. 32, No. 1, Dec. 4, 2019, pp. 4-24.
Qian et al., "Synchronous Maneuver Searching and Trajectory Planning for Autonomous Vehicles in Dynamic Traffic Environments," arXiv:1909.07678, Sep. 17, 2019, pp. 1-14.
Gao et al., "Vectornet: Encoding hd maps and agent dynamics from vectorized representation." Proceedings of the IEEE/CVF Conference on Computer Vision and Pattern Recognition (CVPR), 2020, pp. 11525-11533.
Huang et al., "STGAT: Modeling Spatial-Temporal Interactions for Human Trajectory Prediction," Proceedings of the IEEE/CVF International Conference on Computer Vision (ICCV), 2019, pp. 6272-6281.
Higuchi et al., "Demo: Vehicular Micro Cloud as an Enabler of Intelligent Intersection Management," 2020 IEEE Vehicular Networking Conference (VNC), pp. 1-2.
Lefevre et al., "A survey on motion prediction and risk assessment for intelligent vehicles," ROBOMECH journal, 2014, pp. 1-14.
Tran et al., "Online Maneuver Recognition and Multimodal Trajectory Prediction for Intersection Assistance using Non-parametric Regression," 2014 IEEE Intelligent Vehicles Symposium (IV), pp. 918-923.
Alahi et al., "Social lstm: Human trajectory prediction in crowded spaces," In Proceedings of the IEEE conference on computer vision and pattern recognition, 2016, pp. 961-971.
Altche et al., "An LSTM network for highway trajectory prediction," In 2017 IEEE 20th International Conference on Intelligent Transportation Systems (ITSC), pp. 353-359.
Ammoun et al., "Real time trajectory prediction for collision risk estimation between vehicles," In 2009 IEEE 5th International Conference on Intelligent Computer Communication and Processing, 417-422.
Aoude et al., "Mobile agent trajectory prediction using Bayesian nonparametric reachability trees," In Infotech @ Aerospace 2011, pp. 1-17.
Bahdanau et al., "Neural machine translation by jointly learning to align and translate," ICLR 2015, pp. 1-15.
Bansal et al., "Chauffeurnet: Learning to drive by imitating the best and synthesizing the worst," arXiv:1812.03079, 2018, pp. 1-20.
Barth et al., "Where will the oncoming vehicle be the next second?" In 2008 IEEE Intelligent Vehicles Symposium, 1068-1073.
Casas et al., "Intentnet: Learning to predict intention from raw sensor data," Proceedings of The 2nd Conference on Robot Learning, 2018, pp. 947-956.

(56) References Cited

OTHER PUBLICATIONS

Chai et al., "Multipath: Multiple probabilistic anchor trajectory hypotheses for behavior prediction," 3rd Conference on Robot Learning (CoRL 2019), pp. 1-14.
Chang et al., "Argoverse: 3d tracking and forecasting with rich maps," In Proceedings of the IEEE/CVF Conference on Computer Vision and Pattern Recognition, 2019, pp. 8748-8757.
Chen et al., "The best of both worlds: Combining recent advances in neural machine translation," arXiv:1804.09849, Apr. 27, 2018, pp. 1-12.
Cho et al., "Learning phrase representations using RNN encoder-decoder for statistical machine translation," arXiv:1406.1078, Sep. 3, 2014, pp. 1-15.
Chu et al., "Neural turtle graphics for modeling city road layouts," In Proceedings of the IEEE/CVF International Conference on Computer Vision, 2019, pp. 4522-4530.
Cui et al., "Multimodal trajectory predictions for autonomous driving using deep convolutional networks," In 2019 International Conference on Robotics and Automation (ICRA), pp. 2090-2096.
Deo et al., "Convolutional social pooling for vehicle trajectory prediction," In Proceedings of the IEEE Conference on Computer Vision and Pattern Recognition Workshops, 2018, pp. 1468-1476.
Dosovitskiy et al., "An image is worth 16x16 words: Transformers for image recognition at scale," arXiv:2010.11929, Jun. 3, 2021, pp. 1-22.
Duvenaud et al., "Convolutional networks on graphs for learning molecular fingerprints," arXiv:1509.09292, Nov. 3, 2015, pp. 1-9.
Christoph Feichtenhofer, "Expanding architectures for efficient video recognition," In Proceedings of the IEEE/CVF Conference on Computer Vision and Pattern Recognition, 2020, pp. 203-213.
Gupta et al., "Social gan: Socially acceptable trajectories with generative adversarial networks," In Proceedings of the IEEE Conference on Computer Vision and Pattern Recognition, 2018, pp. 2255-2264.
Hamilton et al., "Inductive representation learning on large graphs," In Proceedings of the 31st International Conference on Neural Information Processing Systems, 2017, pp. 1025-1035.
Hermes et al., "Long-term vehicle motion prediction," In 2009 IEEE intelligent vehicles symposium, 2009, pp. 652-657.
Houenou et al., "Vehicle trajectory prediction based on motion model and maneuver recognition," In 2013 IEEE/RSJ International Conference on Intelligent Robots and Systems, pp. 4363-4369.
Ivanovic et al., "The trajectron: Probabilistic multi-agent trajectory modeling with dynamic spatiotemporal graphs," In Proceedings of the IEEE/CVF International Conference on Computer Vision, 2019, pp. 2375-2384.
Kingma et al., "Adam: A method for stochastic optimization," arXiv:1412.6980, Jan. 30, 2017, pp. 1-15.
Kipf et al., "Semi-Supervised Classification with Graph Convolutional Networks," arXiv:1609.02907, Feb. 22, 2017, pp. 1-14.
Kosaraju et al., "Social-bigat: Multimodal trajectory forecasting using bicycle-gan and graph attention networks," arXiv:1907.03395, Jul. 17, 2019, pp. 1-10.
Lerner et al., "Crowds by Example," In Computer graphics forum, vol. 26, No. 3, 2007, pp. 655-664.
Li et al., "End-to-end contextual perception and prediction with interaction transformer," In 2020 IEEE/RSJ International Conference on Intelligent Robots and Systems (IROS), pp. 5784-5791.
Liang et al., "Learning lane graph representations for motion forecasting," In European Conference on Computer Vision, 2020, pp. 541-556.
Liu et al., "Multimodal Motion Prediction with Stacked Transformers," In Proceedings of the IEEE/CVF Conference on Computer Vision and Pattern Recognition, 2021, pp. 7577-7586.
Luo et al., "Fast and furious: Real time end-to-end 3d detection, tracking and motion forecasting with a single convolutional net," In Proceedings of the IEEE conference on Computer Vision and Pattern Recognition, 2018 pp. 3569-3577.
Mangalam et al., "It is not the journey but the destination: Endpoint conditioned trajectory prediction," In European Conference on Computer Vision, Jul. 18, 2020, pp. 759-776.
Mendieta et al., "CARPe Posterum: A Convolutional Approach for Real-time Pedestrian Path Prediction," arXiv:2005.12469v3, Jun. 9, 2021, pp. 1-9.
Mohamed et al., "Social-stgcnn: A social spatio-temporal graph convolutional neural network for human trajectory prediction," In Proceedings of the IEEE/CVF Conference on Computer Vision and Pattern Recognition, 2020, pp. 14424-14432.
Pellegrini et al., "You'll never walk alone: Modeling social behavior for multitarget tracking," In 2009 IEEE 12th International Conference on Computer Vision, pp. 261-268.
Phan-Minh et al., Covernet: Multimodal behavior prediction using trajectory sets. In Proceedings of the IEEE/CVF Conference on Computer Vision and Pattern Recognition, 2020, pp. 14074-14083.
Polychronopoulos et al., "Sensor fusion for predicting vehicles' path for collision avoidance systems," in IEEE Transactions on Intelligent Transportation Systems, vol. 8, No. 3, Sep. 2007, pp. 549-562.

\* cited by examiner

SYSTEMS AND METHODS FOR PREDICTING TRAJECTORIES OF MULTIPLE VEHICLES

CROSS-REFERENCE TO RELATED APPLICATIONS

This application claims benefit of U.S. Provisional Application No. 63/237,588, filed on Aug. 27, 2021, which is herein incorporated by reference in its entirety.

TECHNICAL FIELD

The subject matter described herein relates, in general, to predicting trajectories, and, more particularly, to predicting trajectories of multiple vehicles within an area using graphs and multiple decoding models.

BACKGROUND

Systems that automate devices estimate motion for control and navigation. For example, an automated vehicle obtains awareness about a surrounding environment and estimates trajectories accordingly for navigation. As such, automated vehicles can estimate motion more accurately and avoid hazards with increased awareness of objects within the surrounding environment. Awareness includes systems estimating the motion of other vehicles in an area. In particular, these systems may use a trained learning model that estimates trajectories for both a subject vehicle and other vehicles in an area.

Moreover, systems that estimate trajectories for multiple vehicles encounter inaccuracies from limited input data and modeling. Certain inaccuracies come from a learning model using perception information derived from sensor data without considering other data, such as operator behavior or preferences. In addition, certain systems use learning models without factoring spatiotemporal interactions (e.g., motion, path, etc.) and data from other vehicles on the road. In this way, the learning model estimates trajectories of multiple vehicles that are less accurate when using a single perspective embodied by the sensor data.

SUMMARY

In one embodiment, example systems and methods relate to predicting trajectories of multiple vehicles using graphs and multiple decoding models that improves motion estimates. In various implementations, systems that estimate trajectories for multiple vehicles encounter inaccuracies from limited input data and motion estimation modeling. For example, a learning model perceives a surrounding environment without considering operator behavior or preferences. The learning model may also estimate less accurate trajectories of multiple vehicles from using a single perspective that does not consider estimates from neighboring vehicles. Therefore, in one embodiment, a prediction system uses graphing and multiple decoding models that consider trajectories and spatiotemporal interactions (e.g., motion, path, etc.) among vehicles for predicting trajectories of multiple vehicles simultaneously. The prediction system uses the prior trajectories with operator preferences (e.g., aggressiveness) in an encoder that computes a graph having a geographic map and vehicle features extracted separately for the multiple vehicles. The prediction system uses the graph to concurrently incorporate encoded features of neighboring vehicles, thereby factoring spatial interactions between the subject and other vehicles in the area. In one approach, a neural network generates the graph using self-attention and cross-attention transformers that extract and compare current and neighboring vehicle information for determining the spatiotemporal interactions.

In various implementations, the prediction system decodes the geographic map and the vehicle features using both probability and regression models. These decoder models estimate trajectories for the multiple vehicles while accounting for the spatiotemporal interactions. Here, the probability model may determine a likelihood (e.g., 90% confidence) that different vehicles will enter a region in the area. Similarly, the regression model may estimate multiple trajectories for different vehicles within the region of the area. Accordingly, the prediction system uses graphing and multiple decoding models to concurrently represent the spatiotemporal interactions and estimate trajectories of the multiple vehicles in the area simultaneously with an increased accuracy.

In one embodiment, a prediction system for predicting trajectories of multiple vehicles using graphs and multiple decoding models is disclosed. The prediction system includes a processor and a memory communicably coupled to the processor. The memory stores an estimation module including instructions that, when executed by the processor, cause the processor to compute, using an encoding model, a graph having geographic map and vehicle features associated with a plurality of vehicles in an area according to characteristics, prior trajectories, and spatiotemporal interactions. The instructions also include instructions to process, using the encoding model, updates for the geographic map and the vehicle features separately in association with encoded features of neighboring vehicles. The instructions also include instructions to decode, using a probability model and a regression model, the geographic map and the vehicle features to output estimated trajectories for the plurality of vehicles.

In one embodiment, a non-transitory computer-readable medium for predicting trajectories of multiple vehicles using graphs and multiple decoding models and including instructions that when executed by a processor cause the processor to perform one or more functions is disclosed. The instructions include instructions to compute, using an encoding model, a graph having geographic map and vehicle features associated with a plurality of vehicles in an area according to characteristics, prior trajectories, and spatiotemporal interactions. The instructions also include instructions to process, using the encoding model, updates for the geographic map and the vehicle features separately in association with encoded features of neighboring vehicles. The instructions also include instructions to decode, using a probability model and a regression model, the geographic map and the vehicle features to output estimated trajectories for the plurality of vehicles.

In one embodiment, a method for predicting trajectories of multiple vehicles using graphs and multiple decoding models is disclosed. In one embodiment, the method includes computing, using an encoding model, a graph having a geographic map and vehicle features associated with a plurality of vehicles in an area according to characteristics, prior trajectories, and spatiotemporal interactions. The method also includes processing, using the encoding model, updates for the geographic map and the vehicle features separately in association with encoded features of neighboring vehicles. The method also includes decoding, using a probability model and a regression model, the geographic map and the vehicle features to output estimated trajectories for the plurality of vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
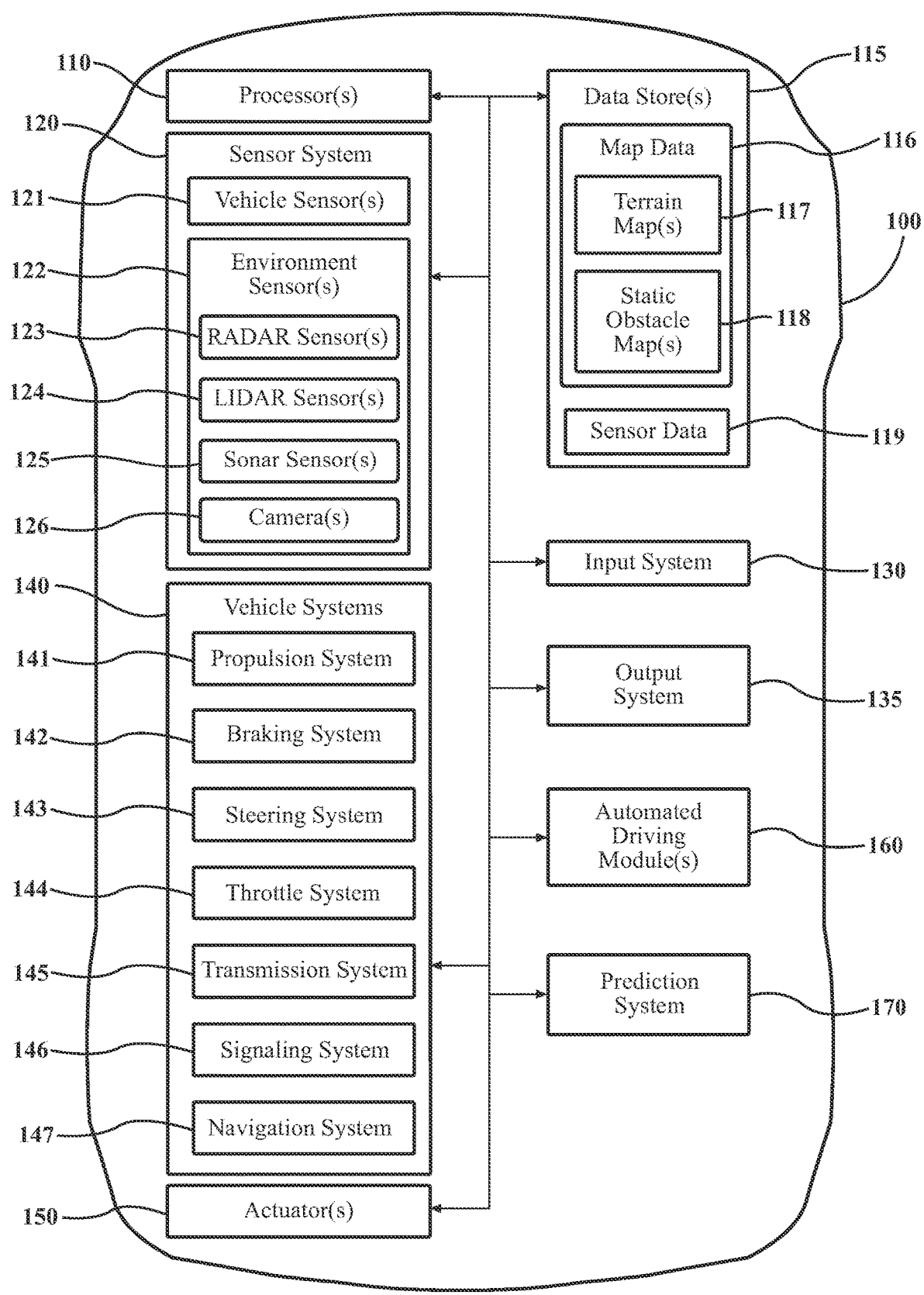
FIG. 1 illustrates one embodiment of a vehicle within which systems and methods disclosed herein may be implemented.

Systems, methods, and other embodiments associated with improving prediction of trajectories involving multiple vehicles using graphs and multiple decoding models are disclosed herein. In various implementations, systems that estimate trajectories for multiple vehicles encounter inaccuracies from using limited input data, especially data from neighboring vehicles. These systems also may not consider operator behavior or preferences that can improve accuracy. Therefore, in one embodiment, a prediction system uses graphing and multiple decoding models that consider spatiotemporal interactions (e.g., motion, path, etc.) among vehicles and neighbor data for predicting trajectories of multiple vehicles simultaneously. The prediction system acquires characteristics (e.g., operator behavior, operator preferences, etc.), prior trajectories, and spatiotemporal (e.g., motion, path, etc.) interactions of vehicles in the area. The vehicle acquires part of this information using data from local sensors. The vehicle may also acquire other parts of this information from the vehicles in the area using communication protocols (e.g., vehicle-to-vehicle (V2V), vehicle-to-everything (V2X), etc.).

Moreover, the prediction system computes a graph using nodes associated with a geographic map and vehicle features of multiple vehicles simultaneously. In particular, the prediction system separately processes geographic map and vehicle data from multiple vehicles to extract related features, thereby improving trajectory estimates for complex road geometries by capturing spatiotemporal interactions. Trajectory predictions are also improved by using the encoded features of neighboring vehicles by capturing spatiotemporal interactions. Furthermore, the prediction system may use transformer encoding for learning features by graphing that generates initial node features for a vehicle and constructs a fully connected graph including neighboring vehicles. In particular, the prediction system learns and aggregates spatiotemporal interactions, information (e.g., position, speed, etc.), or long-term dependencies across vehicles through self-attention transformation that relates different positions of a node feature (e.g., intersection length, vehicle speed, etc.) within a sequence. In one approach, the transformation relates input vectors and input pairs of the learning model to an output that is a weighted sum of the input vectors and the input pairs.

In addition, the prediction system uses a decoder that processes updated features from graph learning. In one approach, the outputs of the graph learning are two updated feature sets, one for vehicles and one for geographic maps, that the prediction system concatenates and inputs to a decoder. The prediction system can decode these features using probability and regression models to output estimated trajectories simultaneously. In particular, the decoder may process the geographic map and vehicle updates as a feature set and output estimated trajectories and probabilities having a minimum confidence level. The decoder may include trajectory probability and trajectory regression modules to process candidate paths and designation regions separately, thereby accounting for spatiotemporal interactions between multiple vehicles and complex road geometries. In this way, the prediction system improves prediction of trajectories involving multiple vehicles using graphs and multiple decoding models while balancing complexity and efficiency.

Now referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the prediction system may be used by road-side units (RSU), a cloud computer, consumer electronics (CE), mobile devices, robots, drones, and so on that benefit from the functionality discussed herein associated with predicting trajectories of multiple vehicles in an area simultaneously using graphs.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to predicting trajectories of multiple vehicles in an area simultaneously using graphs.

Figure 2:
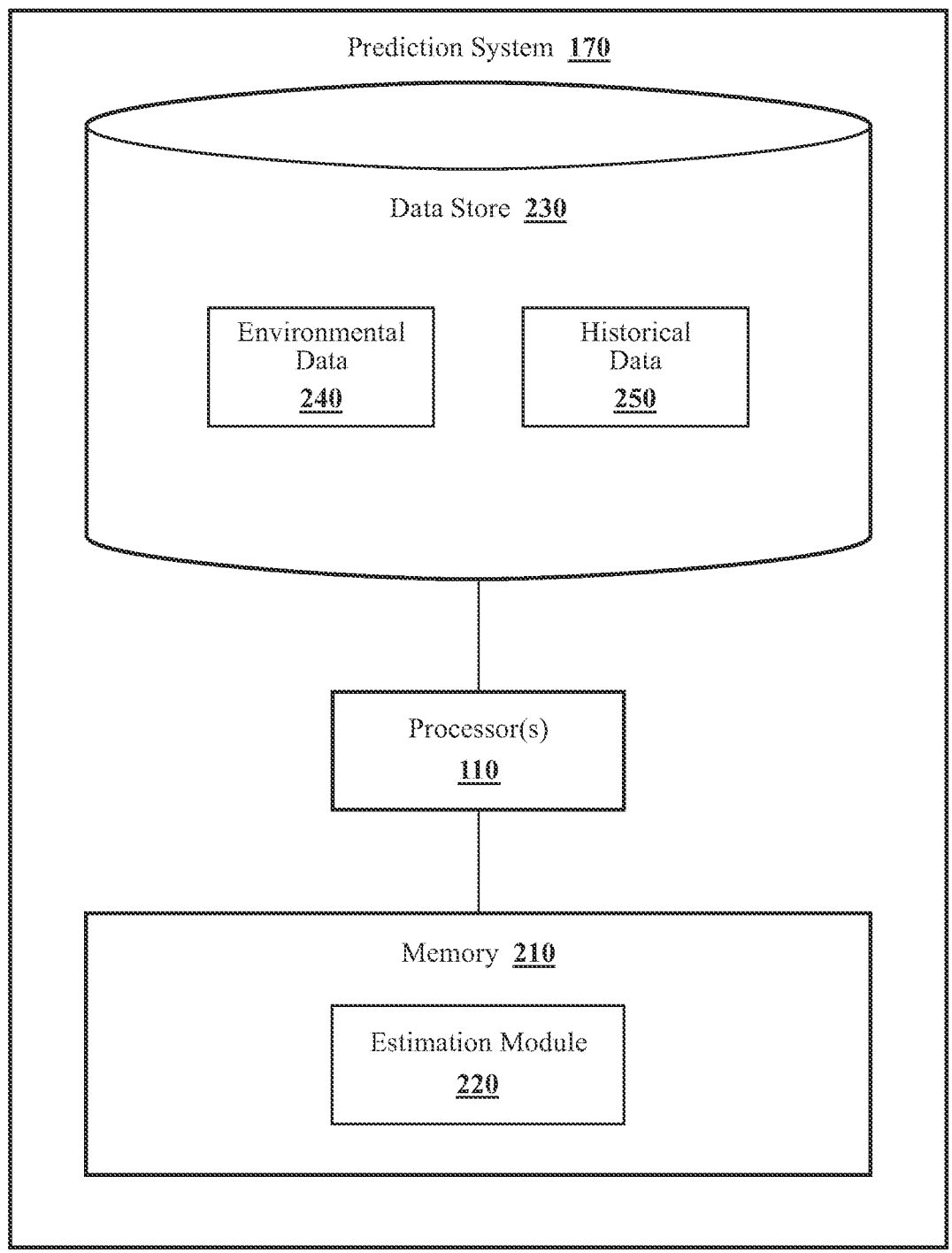
FIG. 2 illustrates one embodiment of a prediction system that is associated with predicting trajectories of vehicles using graphs and multiple decoding models.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. Furthermore, in various implementations, the prediction system 170 operates on a roadside system or the cloud in addition or separate from the vehicle 100 without the processor(s) 110.

In one embodiment, the prediction system 170 includes a memory 210 that stores an estimation module 220. The memory 210 is a random-access memory (RAM), read-only memory (ROM), a hard-disk drive, a flash memory, or other suitable memory for storing the estimation module 220. The estimation module 220 is, for example, computer-readable instructions that when executed by the processor(s) 110 cause the processor(s) 110 to perform the various functions disclosed herein.

As explained subsequently, the estimation module 220 generally includes instructions that function to control the processor(s) 110 to receive data inputs from one or more sources such as sensors of the vehicle 100. The estimation module 220, in one embodiment, controls the respective sensors to provide the data inputs to form part of the environmental information 240. Short-term vehicle history, operator preferences, and long-term vehicle history may form parts of the environmental information 240. Short-term vehicle history represents a past trajectory for one or more vehicles in the scene or the driving environment. The prediction system 170 can obtain such historical information from local storage, a roadside sensing system, vehicle-to-infrastructure (V2I) communication, a cloud service, and so on. Operator preferences may be personalized information (e.g., driver behavior model, driver preference). This information may be specific for an operator and vehicle driving in the current environment. In one approach, this information is stored in a remote server (e.g., a cloud or an edge server). In addition, long-term vehicle history may be information for a specific vehicle, such as historical route and lane selection in the same area.

Moreover, other sources provide information to the prediction system 170, such as historical data 250 having prior trajectories estimated. For instance, the historical data 250 is estimated trajectories from the previous time-step for multiple vehicles in the driving environment. In one approach, the prediction system 170 fuses the environmental information 240 and the historical data 250 for graphing and trajectory predictions to improve accuracy and performance.

In various implementations, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the estimation module 220 in executing various functions. As previously explained, the data store 230 includes the environmental information 240 and the historical data 250 used by the prediction system 170 to generate graphs and predict trajectories of multiple vehicles simultaneously.

The estimation module 220, in one embodiment, is further configured to perform additional tasks. For example, the estimation module 220 includes instructions that cause the processor(s) 110 to compute a graph having a geographic map and vehicle features of multiple agents (e.g., vehicles or pedestrians) in an area. As explained in FIGS. 3-6, these computations may be based on characteristics, prior trajectories, spatiotemporal interactions, and social interactions of the vehicles. The prediction system 170 also updates the geographic map and the vehicle features separately using features of neighboring vehicles. In this way, long and short-term spatiotemporal interactions between vehicles are represented in an area more accurately, thereby improving prediction. Relatedly, the prediction system 170 decodes the geographic map and the vehicle features to output estimated trajectories for the multiple vehicles using a probability model and a regression model. As such, the prediction system 170 concurrently represents the spatiotemporal interactions and estimates trajectories of the vehicles in the area with increased accuracy. The increased accuracy can improve operation of certain applications (e.g., lane changes, intersections) when the vehicle 100 utilizes automated driving or the like.

Furthermore, trajectory prediction of multiple vehicles dynamically from the viewpoint of an ego or primary vehicle involves considering a surrounding environment while managing computational efficiency and accuracy. Vehicle behavior, interactions between vehicles, complexity of road geometries, and incomplete vehicle histories (e.g., prior maneuvers, temporal information, etc.) vary among environments causing estimation uncertainty. As such, the prediction system 170 uses a learning model (e.g., deep neural network (DNN)) and graphing to capture geometric information and geographic map data for predicting multiple trajectories of surrounding vehicles. As explained subsequently, in various implementations, this involves the prediction system 170 using spatiotemporal learning by first extracting spatial features for each vehicle at a time-step and then obtaining final feature encoding by applying temporal learning modes over spatial features.

Figure 3:
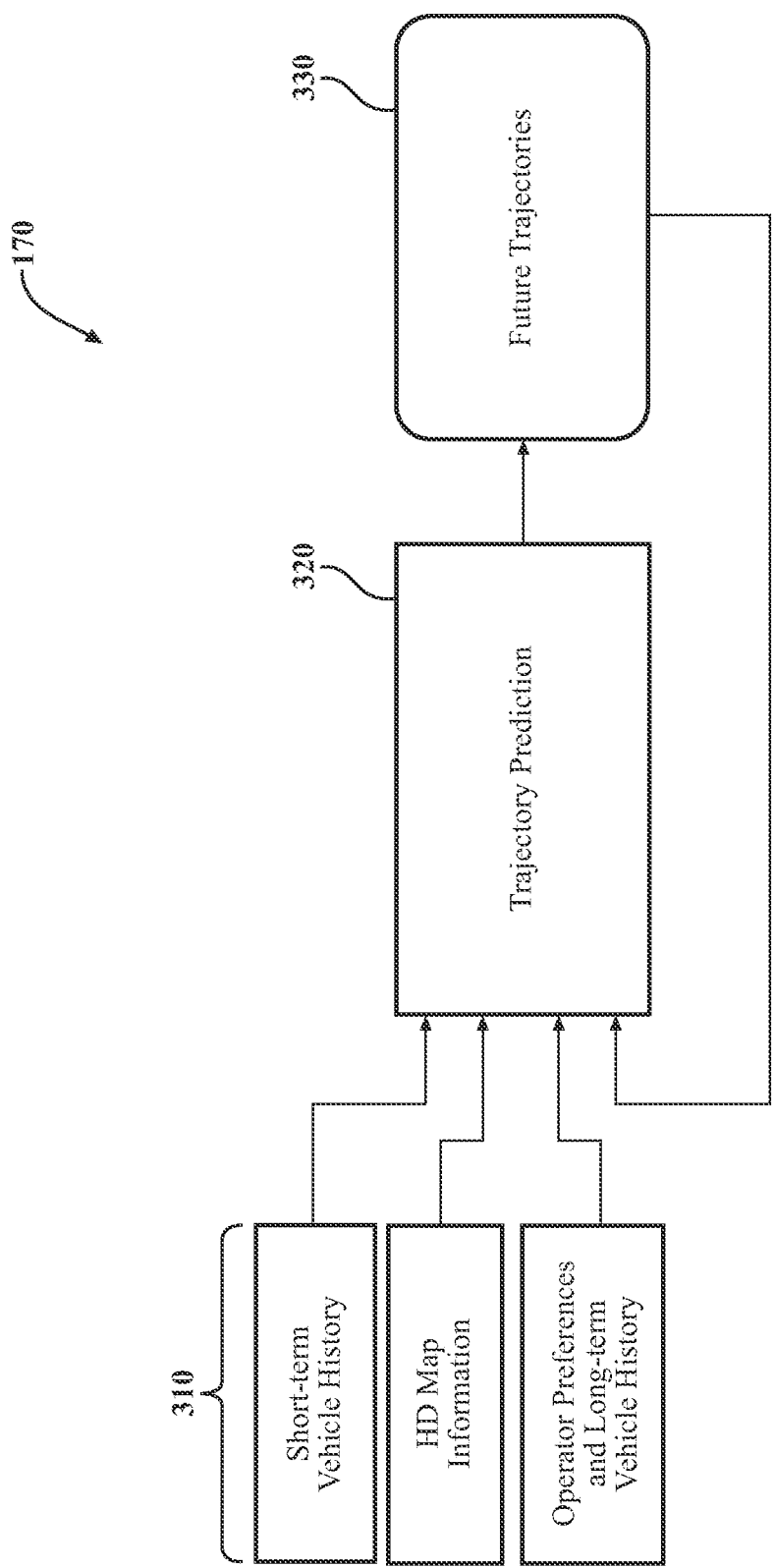
FIG. 3 illustrates one embodiment of the prediction system using various inputs to predict trajectories of vehicles simultaneously through modeling.

FIG. 3 illustrates one embodiment of the prediction system 170 using various inputs 310 to predict trajectories of vehicles simultaneously through modeling. In particular, the prediction system 170 may estimate the future trajectories 330 of multiple vehicles in a scene simultaneously according to short-term vehicle history, high-definition (HD) map information, operator preferences, long-term vehicle history, and historical trajectories previously estimated by the system. Here, vehicle history may include historical routes traveled within an area of the vehicle. HD map information describes detailed geometries for the driving environment (e.g., drivable area, intersection layout, lane attributes, etc.). Operator preferences may include driving style (e.g., aggressive), safety attributes, degrees of control, an operator behavior model, and so on. Any of this information may be saved locally or on a server in the cloud. As given herein, the estimations of the prediction system 170 according to the inputs 310 allows for traffic management, environmental analysis, and cooperative driving applications in addition to controlling the vehicle 100.

Figure 4:
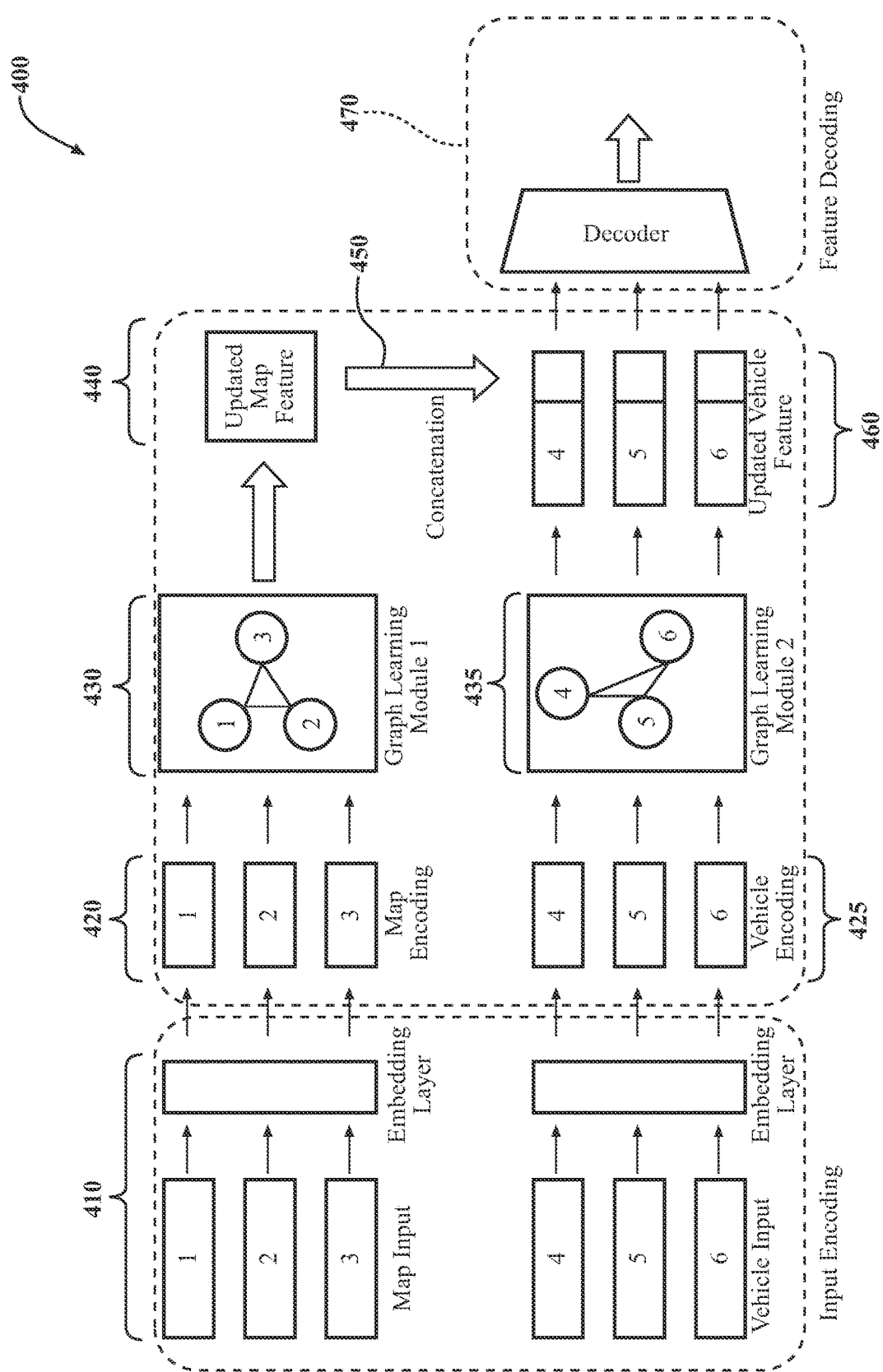
FIG. 4 illustrates one embodiment of the prediction system using input encoding and graph learning to extract features of vehicles simultaneously in an area.

FIG. 4 illustrates one embodiment of the prediction system 170 using input encoding and graph learning to extract features of an area having multiple vehicles simultaneously. In various implementations, the trajectory prediction 320 component may use a graph neural network (GNN) to estimate motion by learning the patterns of multi-vehicle interactions. The prediction system 170 may cache these estimation outputs to update predictions using the future trajectories 330 component. Accordingly, in the system 400 the GNN learns a pattern for spatiotemporal interactions between vehicles simultaneously that improves trajectory predictions of multiple agents (e.g., vehicles or pedestrians). In particular, the GNN may take each object within a scene as a node to build a graph representation as explained subsequently.

Regarding computations, trajectory estimation by the prediction system 170 may involve various steps. In particular, calculations may involve estimating positions of a vehicle for T time steps given the observed past p positions. For a given scene with N agents, we have history observations as:

$$H=\{(x_i^t,y_i^t)|t=-p,\ldots,-1,0\}, \forall i \in \{1,2,\ldots,N\},$$

and Prediction Output $Y=\{(x_i^t,y_i^t)|t=1,2,\ldots,T\}$,
$\forall i \in \{1,2,\ldots,N\}$.  Equations (1) and (2)

Predicted trajectory of an agent can be affected by the desired destination and social interaction of the environment besides historical observations. As such, the prediction system 170 effectively captures these factors and predicts trajectories of all N agents in the scene at a given time step. This is performed while balancing complexity and computation efficiency. In particular, the system 400 encodes inputs 410 representing initial vectors of each geographic map and vehicle information within an area separately. For example, the computation uses input encoding layers (e.g., a dense layer, a convolution layer, long short-term memory (LSTM) layer) as pre-processing by the system 400. This step may scale or normalize input values for improving performance of subsequent processing. The outputs of the input encoding may be vehicle nodes and geographic map nodes, along with respective edge indices used by the prediction system 170 for learning and further computations. As explained herein, the prediction system 170 captures spatiotemporal interactions of vehicles, particularly neighbors, more accurately through multiple modalities and separate chains in the system 400 according to these nodes.

Moreover, the system 400 uses map encoding 420 and vehicle encoding 425 to compute a graph and determine the geographic map and vehicle features utilizing the encoded inputs 410 and encoded features of neighboring vehicles. In particular, the graph learning 430 module may process geographic map data to extract features. The graph learning 435 module may process vehicle data to extract features. Trajectory predictions are improved by using the encoded features of neighboring vehicles by capturing spatiotemporal interactions. Here, graphing is used to represent geographic map and vehicle information.

In various implementations, a graph is constructed by nodes and edges. A node contains a feature encoding of a vehicle or a feature encoding of a map portion. The connection between nodes is determined by edges according to relationships based on probabilities or correlations. For example, the graph may be represented as G=(V, A), where $V=\{V_0, V_1, \ldots, V_N\}$ are nodes that represent each vehicle in a scene. A is the adjacency matrix describing the connectivity or relationships between vehicles. Each node in the graph has an initial node feature $h_i$ that may be updated using data from the updated map feature 440 or the updated vehicle feature 460. In one approach, the prediction system 170 also aggregates map information to capture road geometries and generate a single map feature for the scene that further improves trajectory prediction. As explained subsequently, updated geographic map features are concatenated (450) to form an input vector for each vehicle that is processed by decoder 470.

Figure 5:
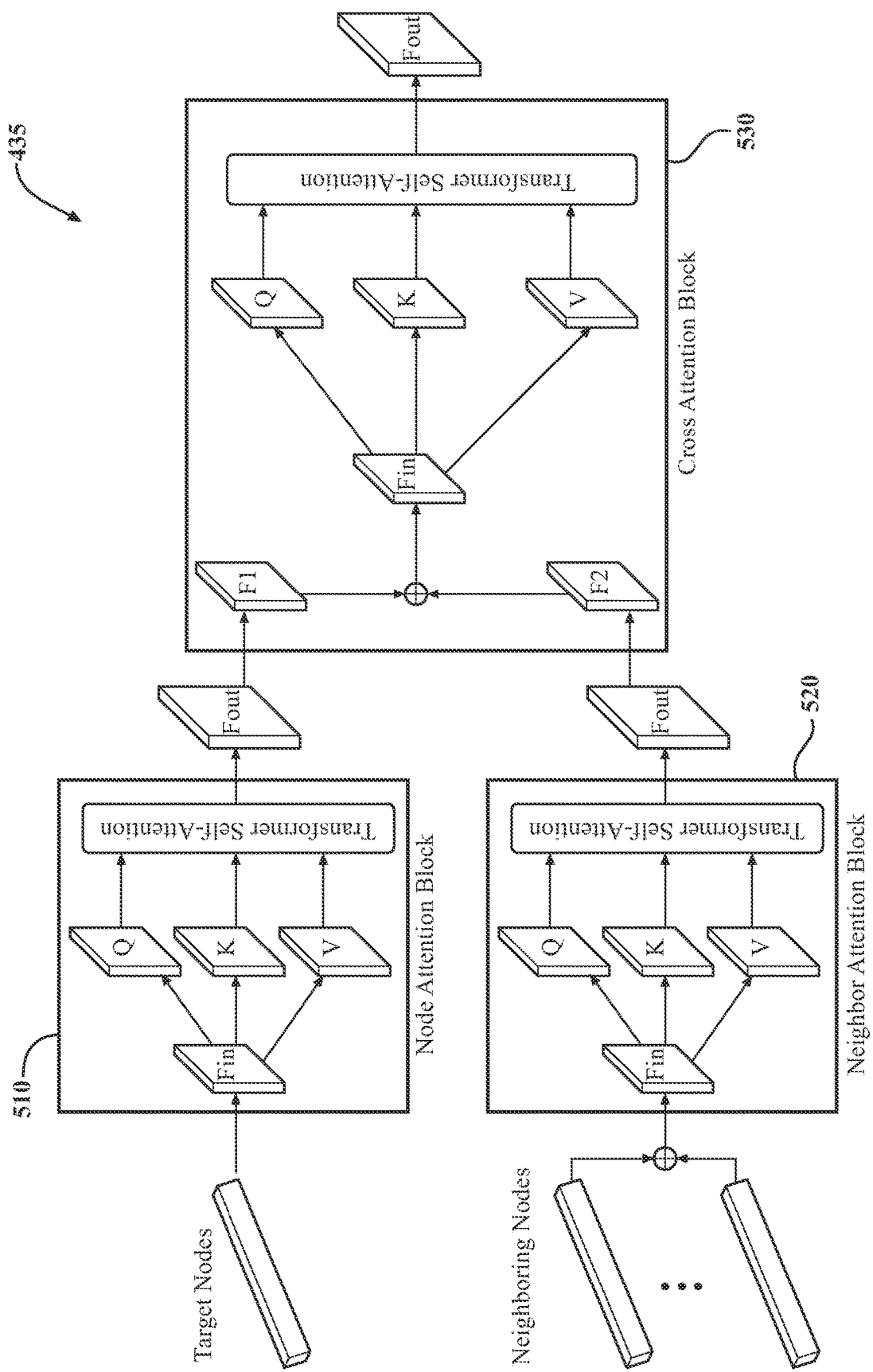
FIG. 5 illustrates one embodiment of the prediction system using graph learning and attention blocks to extract features of vehicles in an area.

In various implementations, the prediction system 170 uses transformer encoding for learning features by graphing. The transformer encoding may be a layer within a learning model (e.g., a GNN, an isomorphic model, etc.) that can generate initial node features from inputs 410 or other raw inputs and construct a fully connected graph. As an example, the node-attention block 510 and the neighbor-attention block 520 in FIG. 5 are used for graphing and extracting features of vehicles in an area through transformer encoding. In various implementations, the prediction system 170 learns and aggregates spatiotemporal interactions, relevant information (e.g., position, speed, etc.), or long-term dependencies across vehicles through self-attention transformation. For example, the learned transformation can predict trajectories of multiple vehicles simultaneously according to HD map features.

Moreover, transformer encoding involves relating different positions of a node feature (e.g., intersection length, vehicle speed, etc.) within a sequence to compute a representation of the sequence and extract the node feature associated with the vehicle 100. In one approach, the transformation relates input vectors and input pairs of the learning model to an output that is a weighted sum of the input vectors and the input pairs. In this way, the prediction system 170 captures interactions between vehicles accurately, thereby improving predictions of multiple trajectories simultaneously.

Moreover, the cross-attention block 530 computes a weighted sum of related input vectors and input pairs outputted from the node-attention block 510 and the neighbor-attention block 520. Here, an attention operation of a node incorporates information of a vehicle node or a neighboring node and updates the node feature, such as through a graph convolution computation. As such, the neighbor-attention block efficiently learns and extracts relevant information (e.g., position, speed, etc.) from the input feature of neighbors using self-attention transformation. Similarly, a cross-attention block efficiently learns and extracts relevant information from node features and features of neighbors according to self-attention transformation.

Regarding further computations performed by the prediction system 170, for a node $v_i \in V$, the node feature $h_i$ may be updated by graph learning as follows:

$$h'_i = \Theta \sum_{j \in \mathcal{N}(i)} \frac{e_{j,i}}{\sqrt{\hat{d}_j \hat{d}_i}} h_j. \quad \text{Equation (3)}$$

with $\hat{d}_i = 1 + \sum_{j \in \mathcal{N}(i)} e_{j,i}$, where $h'_i$ is the updated node feature and $\Theta$ are trainable parameters. Also, $\mathcal{N}(i)$ represents all neighboring nodes or node i and $e_{j,i}$ denotes the edge weight from source node j to target node i. Here, $\hat{d}_j$ and $\hat{d}_i$ represent edge weights matrices and $$\frac{e_{j,i}}{\sqrt{\hat{d}_j \hat{d}_i}}$$

is used to calculate the corresponding wedge weight for node j.

In one approach, the node feature $h_i$ may be updated using Equation (4) to reduce complexity and redundant computation for less demanding applications (e.g., parking):

$$h'_i = \phi_0(\phi_1(1+\epsilon) \cdot h_i + \phi_2 \sum_{j \in \mathcal{N}(i)} h_j). \quad \text{Equation (4)}$$

where $\phi_0$, $\phi_1$, and $\phi_2$ are attention blocks, $\epsilon$ is a learnable parameter, and $\mathcal{N}(i)$ are all neighboring nodes of node i. In particular, $\phi_1$ is the node-attention block, $\phi_2$ is the neighbor-attention block, and $\phi_0$ is the cross-attention block.

Regarding details on the transformation computations, given a node feature h of dimension $D_h$, the transformer in each attention block will first compute a set of queries, keys and values (Q, K, V) based on their weight matrices ($W_q \in \mathbb{R}^{D_h \times D_q}$, $W_q \in \mathbb{R}^{D_h \times D_k}$, $W_q \in \mathbb{R}^{D_h \times D_v}$). The transformer then aggregates the values for each query by attention weights A. A non-linear transformation (e.g., multi-layer perceptron (MLP)) is used to calculate the output feature $h_{out}$:

$$Q = W_q \times h, K = W_k \times h, V = W_v \times h; \quad \text{Equation (5)}$$

$$A = \text{softmax}\left(\frac{QK}{\sqrt{D_k}}\right) V; \quad \text{Equation (6)}$$

$$h_{out} = MLP(A) + h. \quad \text{Equation (7)}$$

Accordingly, the system 400 may update each node feature according to features about neighbors such as through computations using Equation (3)-Equation (7). In one approach, vehicle nodes and geographic map nodes go through separate graph computations with similar operators for feature updates to capture spatiotemporal interactions. As such, the outputs of the graph learning may be two sets of feature updates, one for vehicles and one for geographic maps. The prediction system 170 concatenates these outputs for inputting to the decoder 470.

Figure 6:
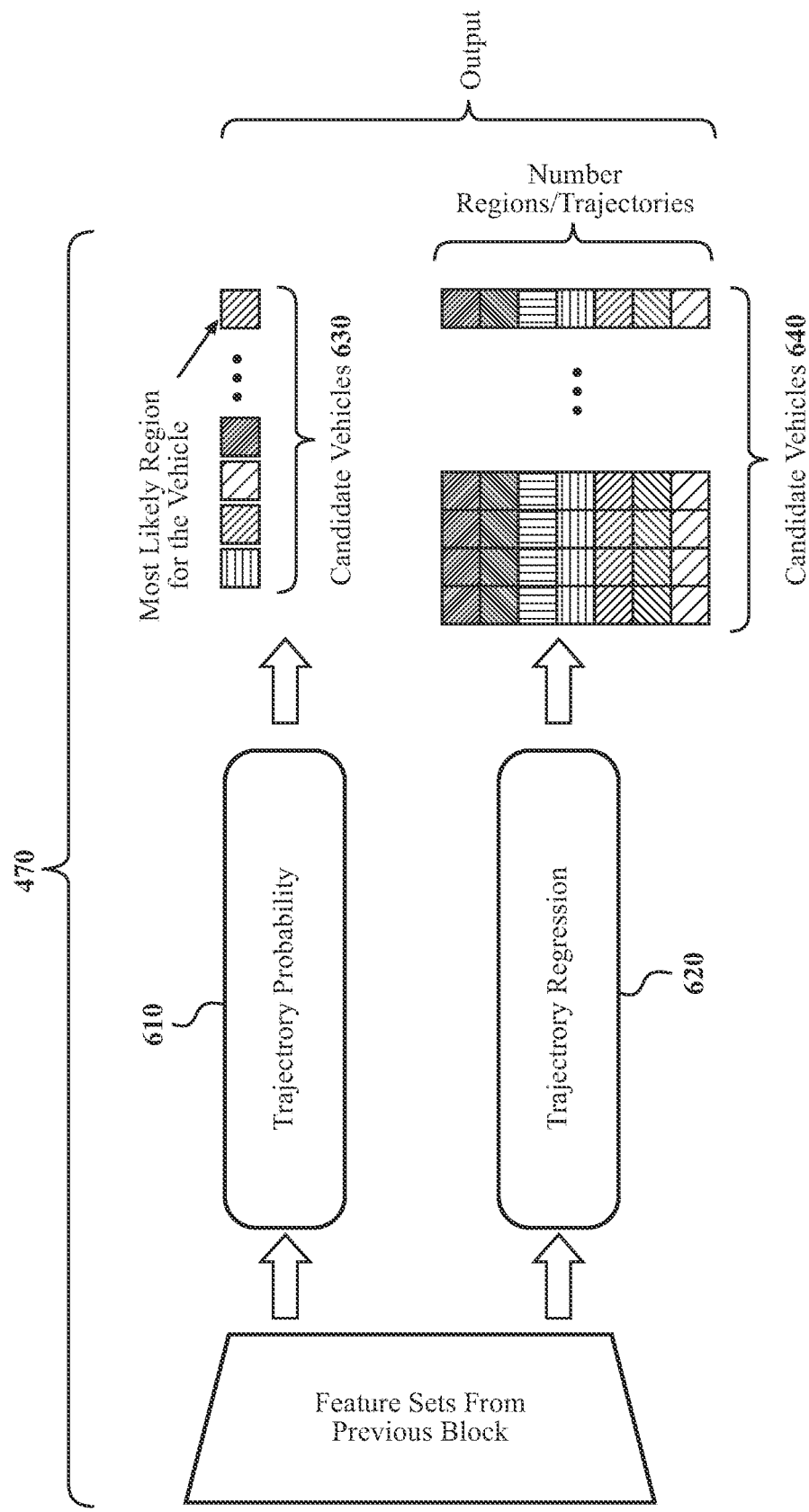
FIG. 6 illustrates one embodiment of the prediction system using decoding of extracted features to predict trajectories of multiple vehicles simultaneously.

Regarding further computations, FIG. 6 illustrates one embodiment of the prediction system 170 using decoding of extracted features to predict trajectories of multiple vehicles simultaneously. The decoder 470 processes the two sets of feature updates and outputs estimated trajectories and probabilities having a minimum confidence level. In particular, the decoder 470 includes the components trajectory probability 610 and trajectory regression 620. In various implementations, the trajectory probability 610 selects a trajectory using a MLP model. In particular, set 630 is an output representing the most likely region or destination for candidate vehicles. The trajectory regression 620 may use a recurrent neural network (RNN), a convolution-based decoder, or a MLP model to output a number of regions or trajectories for a set 640 that represents candidate vehicles.

In various implementations, the decoding involves the trajectory regression 620 predicting K possible trajectories and the trajectory probability 610 generating respective confidence scores. As such, the prediction system 170 may apply a three-layer MLP for the i-th agent to predict k-th trajectories as:

$$\text{Reg}_i^k = \{(x_1^k, y_1^k), (x_2^k, y_2^k), \ldots, (x_T^k, y_T^k)\}. \quad \text{Equation (8)}$$

where T is the prediction horizon. Similarly, the K confidence scores for the i-th agent may be represented by:

$$\text{Confidence}_i = \{(c_0, c_1, \ldots, c_{K-1}\}. \quad \text{Equation (9)}$$

To improve estimations, the prediction system 170 trains certain models. Training may involve summing the trajectory regression loss $\mathcal{L}_{reg}$ and trajectory probability loss $\mathcal{L}_{conf}$ according to training data. For trajectory regression, among K predicted trajectories of an agent, the prediction system 170 calculates the smooth $\ell 1$ loss using selected candidate trajectory $\hat{k}$, which has the minimum final displacement error with a ground-truth trajectory. For trajectory selection, we calculate the hinge loss across agents as $\mathcal{L}_{conf}$:

$$\mathcal{L}_{reg} = \frac{1}{NT} \sum_{n=1}^{N} \sum_{t=1}^{T} \ell 1(\hat{k}, k^{gt}); \quad \text{Equation (10)}$$

$$\mathcal{L}_{conf} = \frac{1}{N(K-1)} \sum_{n=1}^{N} \sum_{k \neq \hat{k}} \max\left(0, 1 + c_{n,k} - c_{n,\hat{k}}\right). \quad \text{Equation (11)}$$

Here, N is the number of agents in a given scene. As such, the prediction system 170 uses these losses to adjust parameters and improve operations during inference or implementation, such as in the vehicle 100.

Figure 7:
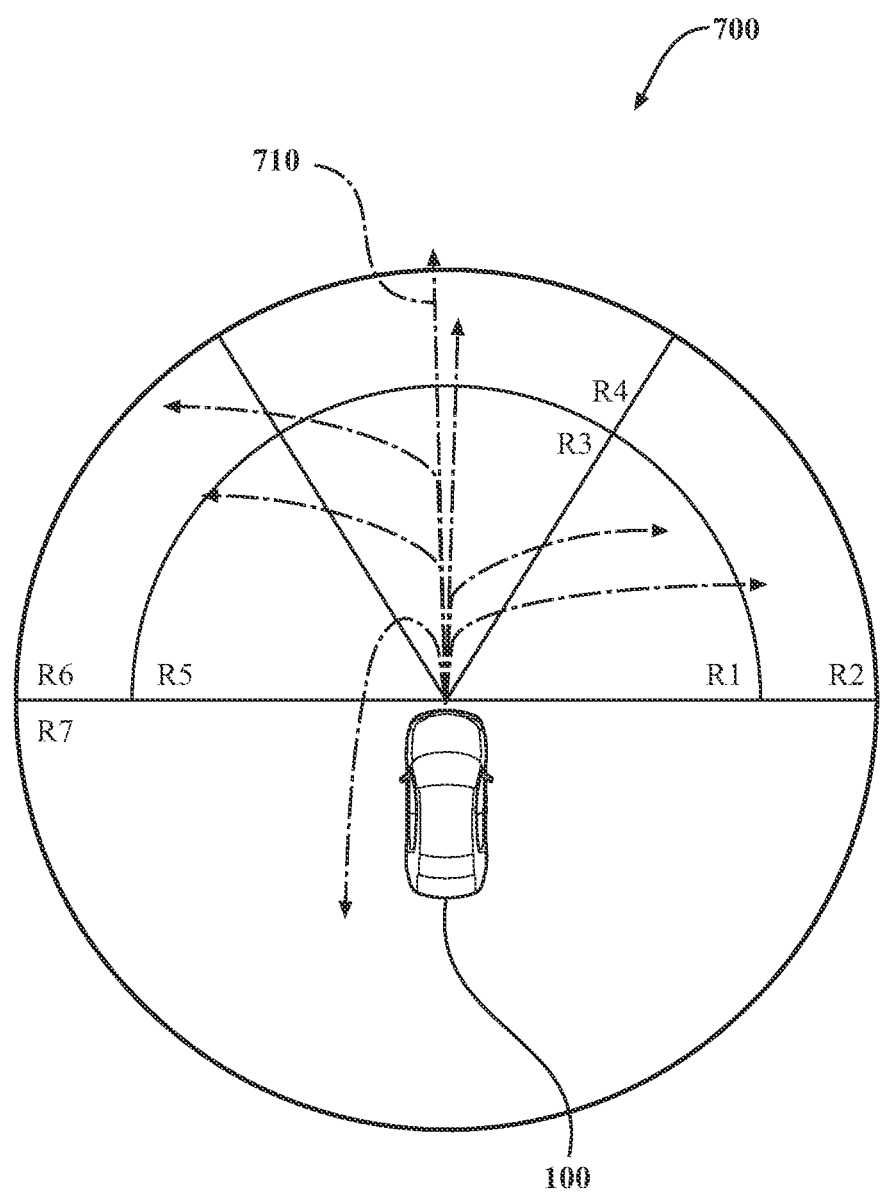
FIG. 7 illustrates an example of the prediction system predicting multiple trajectories and destination regions for vehicles.

FIG. 7 illustrates an example 700 of the prediction system 170 predicting multiple trajectories 710 and destination regions for vehicles. In one approach, the prediction system 170 divides a surrounding space of the vehicle 100 into seven regions. During operation of the prediction system 170, the trajectory regression 620 may predict a set of seven trajectories, one for each region and vehicle, using the modeling previously explained. In one approach, the trajectory regression 620 uses seven separate decoders each corresponding to a region for estimating motion of multiple vehicles simultaneously for certain applications accordingly. The trajectory probability 610 computes probabilities for the likely region for the vehicle destination and selects the trajectory corresponding to the region. The prediction system 170 may use these results as output.

Figure 8:
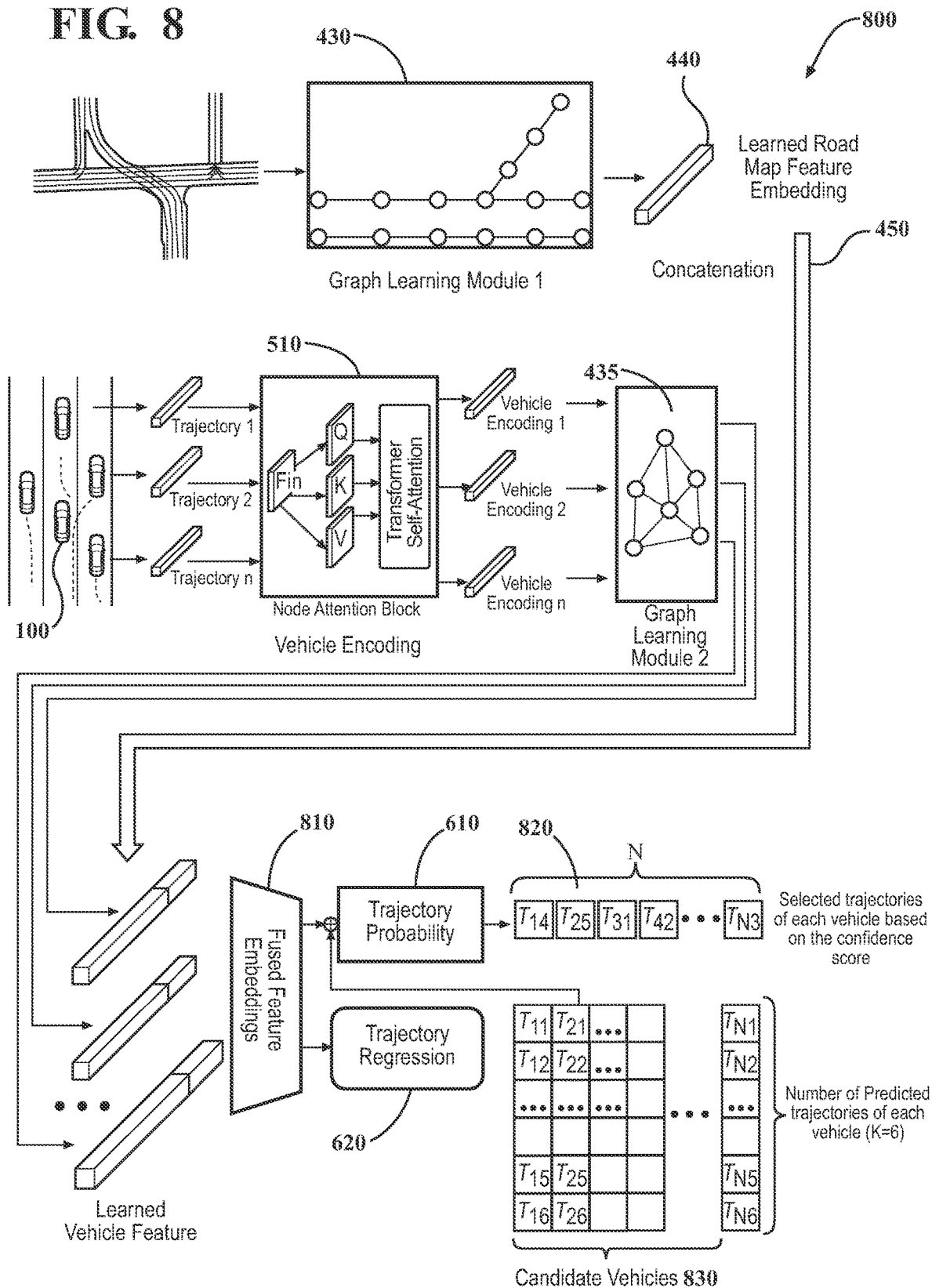
FIG. 8 illustrates one embodiment of the prediction system using road geometry graphing, vehicle spatiotemporal graphing, and decoding of extracted features to predict trajectories of vehicles.

FIG. 8 illustrates one embodiment of the prediction system 170 in a system 800 using road geometry graphing, vehicle spatiotemporal graphing, and decoding of extracted features to predict trajectories of vehicles simultaneously. The system 800 involves processing similar to that explained for the system 400 and predicts the trajectories for multiple vehicles simultaneously. Here, the module 810 fuses feature embeddings used to calculate trajectory probabilities and regression for N vehicles 820 for improving accuracy. Furthermore, the output of the trajectory regression 620 may represent candidate vehicles and trajectories 830. This output is feedback to the trajectory probability 610 for computing probabilities of the likely region a vehicle(s) will be located and the trajectory corresponding to the region. In this way, the output of the trajectory probability 610 factors computations by the trajectory regression 620.

Figure 9:
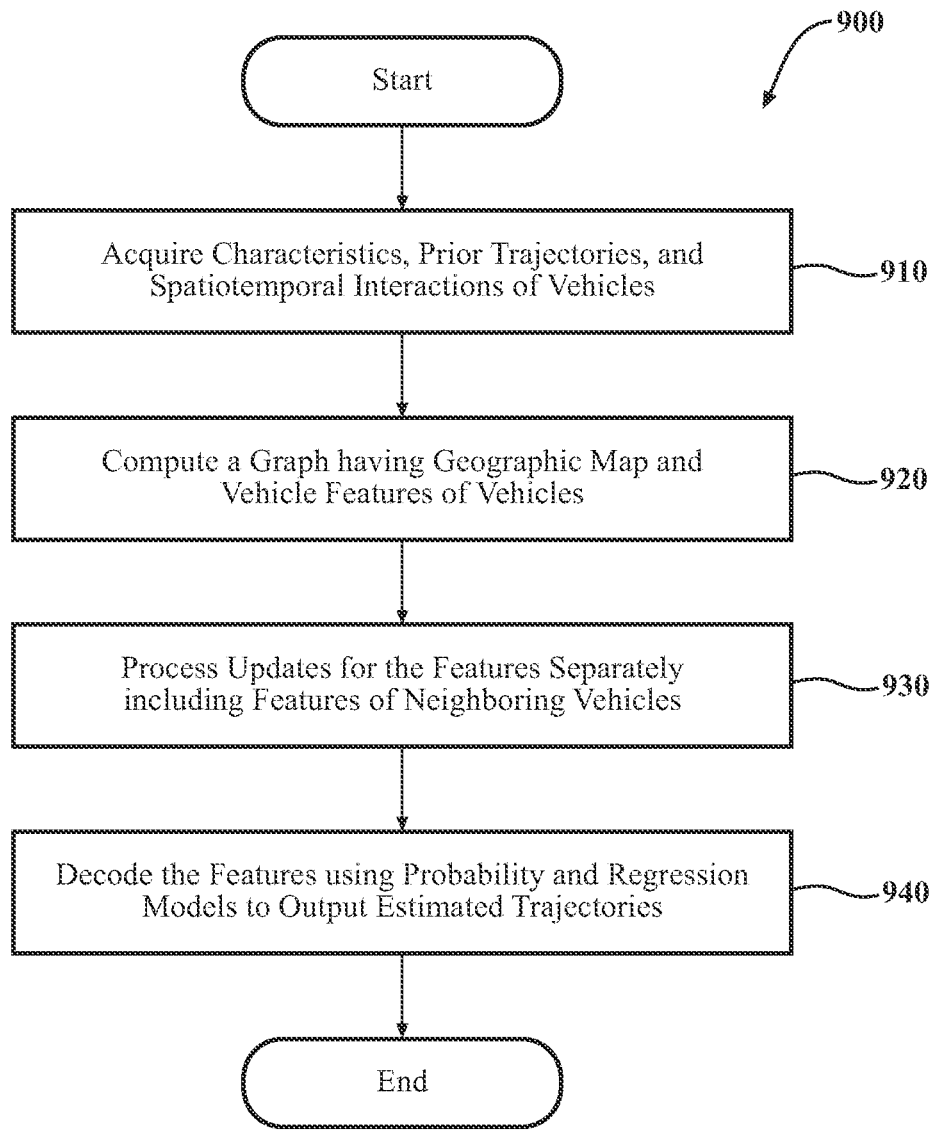
FIG. 9 illustrates one embodiment of a method that is associated with predicting trajectories of multiple vehicles using graphs and multiple decoding models.

Additional aspects of predicting trajectories of multiple vehicles will be discussed in relation to FIG. 9. FIG. 9 illustrates a flowchart of a method 900 that is associated with predicting trajectories of multiple vehicles using graphs and multiple decoding models simultaneously. Method 900 will be discussed from the perspective of the prediction system 170 of FIGS. 1 and 2. While method 900 is discussed in combination with the prediction system 170, it should be appreciated that the method 900 is not limited to being implemented within the prediction system 170 but is instead one example of a system that may implement the method 900.

At 910, the prediction system 170 acquires characteristics, prior trajectories, and spatiotemporal (e.g., motion, path, etc.) interactions of multiple vehicles. As previously explained, characteristics can be operator behavior, a historical trajectory from a prior time-step, road geometries, and operator preferences (e.g., aggressiveness) for vehicles in an area. In various implementations, the vehicle 100 acquires part of this information using environment sensors 122 or sensor data 119. The vehicle 100 acquires other parts of this information from the vehicles in the area using communication protocols (e.g., vehicle-to-vehicle (V2V), vehicle-to-everything (V2X), etc.). In this way, the prediction system 170 improves the accuracy of predicting trajectories of multiple vehicles by factoring data and estimates from neighboring vehicles.

At 920, the prediction system 170 computes a graph having a geographic map and vehicle features of multiple vehicles simultaneously. In particular, the prediction system 170 separately processes geographic map and vehicle data from multiple vehicles to extract related features, thereby improving trajectory estimates for complex road geometries. As previously explained, trajectory predictions are also improved by using the encoded features of neighboring vehicles that capture spatiotemporal interactions. Here, the graphing is used to represent geographic map and vehicle information. In general, a graph is constructed by nodes and edges. A node contains a feature encoding of a vehicle or a feature encoding of a map portion. The connection between nodes is determined by edges according to relationships based on probabilities or correlations.

Furthermore, the prediction system 170 may use transformer encoding for learning features by graphing that involves generating initial node features and constructing a fully connected graph. As explained in FIG. 5, the prediction system 170 learns and aggregates spatiotemporal interactions, relevant information (e.g., position, speed, etc.), or long-term dependencies across vehicles through a self-attention transformation. This type of transformation relates different positions of a node feature (e.g., intersection length, vehicle speed, etc.) within a sequence. Self-attention transformation also involves computing a representation of the sequence and extracting the node feature of the vehicle 100. In one approach, the transformation relates input vectors and input pairs of the learning model to an output that is a weighted sum of the input vectors and the input pairs. In this way, the prediction system 170 captures interactions between vehicles accurately, thereby improving predictions of multiple trajectories simultaneously.

In various implementations, graphing by the prediction system 170 involves computations for neighbor-attention learning. This computation extracts relevant information (e.g., position, speed, etc.) from the input feature of neighbors using self-attention transformation. Similarly, a cross-attention block can be used by the prediction system 170 to efficiently learn and extract relevant information from node features and neighbor features based on self-attention transformation.

At 930, the prediction system 170 processes updates for the features separately including features of neighboring vehicles. As previously explained, the prediction system 170 separately processes geographic map and vehicle data from multiple vehicles to extract related features, thereby improving trajectory estimates for complex road geometries. In addition, vehicle nodes and geographic map nodes go through separate graph computations with similar operators for feature updates to capture spatiotemporal interactions. The outputs of the graph learning may be two updated feature sets, one for vehicles and one for maps, that the prediction system 170 concatenates and inputs to a decoder.

At 940, the prediction system 170 decodes the features using probability and regression models to output estimated trajectories simultaneously. In particular, the decoder may process the geographic map and vehicle updates as a feature set and output estimated trajectories and probabilities having a minimum confidence level. The decoder may include trajectory probability and trajectory regression modules that compute candidate paths and designation regions separately to improve estimates for complex road geometries.

In various implementations, the trajectory probability module selects a trajectory using a MLP model. In particular, the module output represents the most likely destination regions for candidate vehicles. Furthermore, the trajectory regression module may use a RNN, a convolution-based decoder, or a MLP model to output a number regions or trajectories for a set that represents candidate vehicles. In this way, the prediction system 170 improves estimates by accounting for spatiotemporal interactions between multiple vehicles and complex road geometries using separate or different models.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can bean electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As previously explained, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system for motion estimation, comprising:
a processor; and
a memory communicably coupled to the processor and storing:
an estimation module including instructions that, when executed by the processor, cause the processor to:
compute, using an encoding model, a graph having geographic map and vehicle features associated with a plurality of vehicles in an area according to prior trajectories and spatiotemporal interactions;
process, using the encoding model, updates for the geographic map and the vehicle features separately in association with encoded features of neighboring vehicles that include a location; and
decode, separately using a probability model and a regression model, the geographic map and the vehicle features to output estimated trajectories that control one of the plurality of vehicles among a time-step.

2. The prediction system of claim 1, wherein the instructions to process the updates further include instructions to:
extract, using a node-attention component of the encoding model, a node feature of the graph according to a first self-attention transformer; and
determine, using a neighbor-attention component of the encoding model, a neighbor feature according to a second self-attention transformer.

3. The prediction system of claim 2, further including instructions to extract, using a cross-attention component of the encoding model, qualities to update the geographic map and the vehicle features using the node feature and the neighbor feature according to a third self-attention transformer.

4. The prediction system of claim 3, further including instructions to output, by the cross-attention component, a weighted sum of related input vectors and input pairs outputted from the node-attention component and the neighbor-attention component.

5. The prediction system of claim 2, wherein the first self-attention transformer relates different positions of the node feature within a sequence to compute a representation of the sequence and extract the node feature.

6. The prediction system of claim 2, wherein the node-attention component or the neighbor-attention component relates input vectors and input pairs of the encoding model to an output that is a weighted sum of the input vectors and the input pairs.

7. The prediction system of claim 1, wherein the instructions to decode the geographic map and the vehicle features further include instructions to:
estimate a regional destination within the area for the plurality of vehicles using the probability model for training; and
estimate regional trajectories for the plurality of vehicles within the regional destination using the regression model for training.

8. The prediction system of claim 1, further including instructions to select, using a multi-layer perceptron (MLP) model for the probability model, probabilities that the plurality of vehicles will enter a region in the area.

9. The prediction system of claim 1, wherein the instructions to decode the geographic map and the vehicle features further include instructions to:
adjust a time horizon and a time-step for the probability model and the regression model according to one of traffic management and environmental analysis.

10. A non-transitory computer-readable medium for motion estimation comprising:
instructions that when executed by a processor cause the processor to:
compute, using an encoding model, a graph having geographic map and vehicle features associated with a plurality of vehicles in an area according to prior trajectories and spatiotemporal interactions;
process, using the encoding model, updates for the geographic map and the vehicle features separately in association with encoded features of neighboring vehicles that include a location; and
decode, separately using a probability model and a regression model, the geographic map and the vehicle features to output estimated trajectories that control one of the plurality of vehicles among a time-step.

11. A method comprising:
computing, using an encoding model, a graph having a geographic map and vehicle features associated with a plurality of vehicles in an area according to prior trajectories and spatiotemporal interactions;
processing, using the encoding model, updates for the geographic map and the vehicle features separately in association with encoded features of neighboring vehicles that include a location; and
decoding, separately using a probability model and a regression model, the geographic map and the vehicle features to output estimated trajectories that control one of the plurality of vehicles among a time-step.

12. The method of claim 11, wherein processing the updates further includes:
extracting, using a node-attention component of the encoding model, a node feature of the graph according to a first self-attention transformer; and
determining, using a neighbor-attention component of the encoding model, a neighbor feature according to a second self-attention transformer.

13. The method of claim 12, further comprising extracting, using a cross-attention component of the encoding model, qualities to update the geographic map and the vehicle features using the node feature and the neighbor feature according to a third self-attention transformer.

14. The method of claim 13, further comprising outputting, by the cross-attention component, a weighted sum of related input vectors and input pairs outputted from the node-attention component and the neighbor-attention component.

15. The method of claim 12, wherein the first self-attention transformer relates different positions of the node feature within a sequence to compute a representation of the sequence and extract the node feature.

16. The method of claim 12, wherein the node-attention component or the neighbor-attention component relates input vectors and input pairs of the encoding model to an output that is a weighted sum of the input vectors and the input pairs.

17. The method of claim 11, wherein decoding the geographic map and the vehicle features further includes:
   estimating a regional destination within the area for the plurality of vehicles using the probability model for training; and
   estimating regional trajectories for the plurality of vehicles within the regional destination using the regression model for training.

18. The method of claim 11, further comprising selecting, using a multi-layer perceptron (MLP) model for the probability model, probabilities that the plurality of vehicles will enter a region in the area.

19. The method of claim 11, wherein decoding the geographic map and the vehicle features further includes adjusting a time horizon and a time-step for the probability model and the regression model according to one of traffic management and environmental analysis.

20. The method of claim 11, wherein the encoding model is a graph neural network (GNN) that represents the spatiotemporal interactions concurrently between the plurality of vehicles in a pattern and the encoded features of the neighboring vehicles are associated with other spatiotemporal interactions of the plurality of vehicles.

* * * * *